Sept. 16, 1924.
R. MATTICE
1,508,800
METHOD OF AND APPARATUS FOR REPAIRING METALLIC STRUCTURES
Filed June 15, 1922
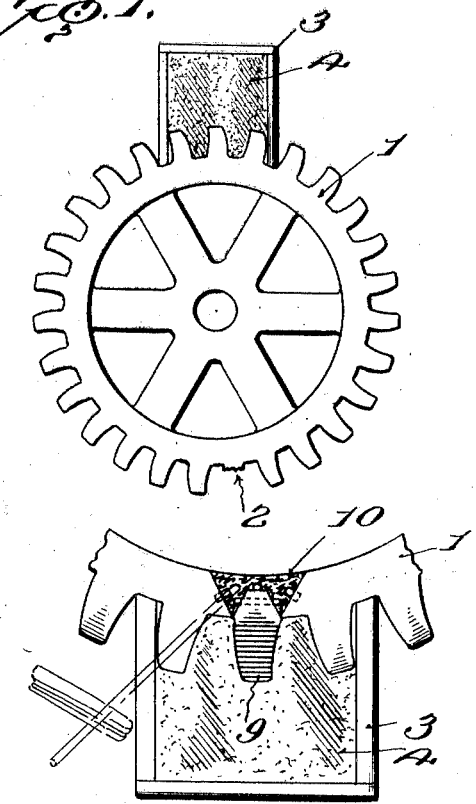
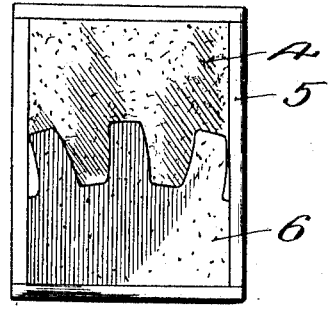
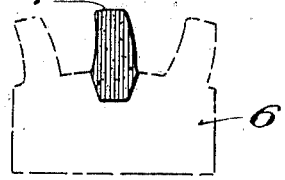
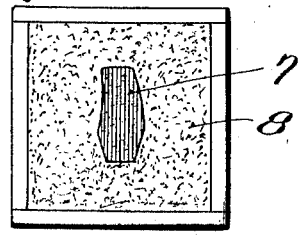
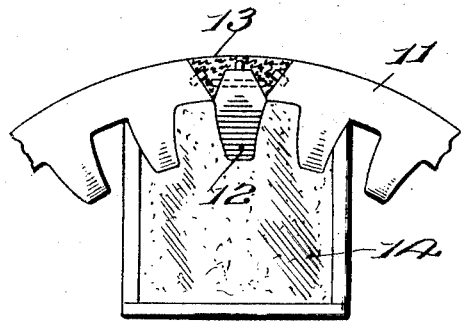
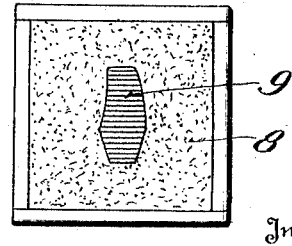
Inventor
Royal Mattice
By Helge Numa
his Attorney Patented Sept. 16, 1924.

1,508,800

UNITED STATES PATENT OFFICE.

ROYAL MATTICE, OF PHILADELPHIA, PENNSYLVANIA.

METHOD OF AND APPARATUS FOR REPAIRING METALLIC STRUCTURES.

Application filed June 15, 1922. Serial No. 568,460.

*To all whom it may concern:*

Be it known that I, ROYAL MATTICE, a citizen of the United States, residing at Philadelphia, in the county of Philadelphia and State of Pennsylvania, have invented certain new and useful Improvements in Methods of and Apparatus for Repairing Metallic Structures, of which the following is a specification.

My invention relates primarily to gear repairing, and generally stated, involves a method of forming and inserting a replacement portion of a broken or mutilated gear, said replacement portion constituting a replica of an unbroken portion of the gear.

More particularly stated, the herein described method of repairing metal structures, such as gears for example and more especially the toothed portion thereof, consists in forming a pattern from a portion of the good or unmutilated teeth corresponding to the portion or section to be replaced and from said pattern produce still another pattern from which latter a true casting of the replacement portion can be easily made, said casting forming the new or replacement portion adapted to be inserted within the broken portion of the gear and welded therein.

The invention has for an object to provide a method of repair wherein the identical contour of the gear teeth can be easily obtained and one or more teeth corresponding to the number broken or mutilated can be easily reproduced with the exact contour, imperfections and worn portions incident to the periods of service of the gear.

Heretofore it has been customary to cut or machine the replacement teeth of normal size and then weld said tooth in place, but such a method has been found to be unsatisfactory in that the replacement portion or tooth is not of a size or shape corresponding to the worn shape of the adjacent teeth of the gear and, as a result the normal fullness on the face of the replaced tooth carries the load and soon breaks again under the strains imparted thereto. Further difficulties in welding a replacement tooth not properly shaped to conform to the associated teeth of the gear have been also experienced, the V-shaped recess into which the replaced tooth is positioned being insufficient and improperly located to permit proper disposition of additional welding metal to form a tight union.

The present method of replacing broken gear teeth has been devised to overcome the foregoing or other difficulties, it being apparent that by my present method a broken tooth occurring in gears interassociated with other mechanism and parts not easily disassembled or a broken gear not possible to repair in place by methods now known can be rapidly and inexpensively repaired by my method herein set forth and without disassembling or disturbing the work, gear or associated mechanism. My present invention also contemplates means for carrying out the process or method in the use of the pattern in maintaining the replacement tooth or teeth, as the case may be, in position within the broken portion of the gear, said pattern serving to maintain the proper pitch line of the replaced tooth or teeth and to also prevent any change or dislodgment of the replaced tooth or teeth during welding caused by shrinkage or contraction of the metal.

In order that my method of repair and replacement may more readily be understood, I have chosen the accompanying drawing in which there is somewhat diagrammatically shown the several steps incident to my improved process of metal replacement.

In the accompanying drawings:

Figure 1 is a view in side elevation of a gear shown with a broken tooth, and a material receiving frame applied to another portion of the gear teeth for forming the pattern which, for purposes herein, I will refer to as the negative pattern.

Figure 2 is a view illustrating the formation from the negative pattern of still another pattern to be referred to herein for purposes of differentiation, as the positive pattern.

Figure 3 is a detached view of the positive pattern showing portions thereof trimmed or cut away to provide the exact shape of pattern required from which to cast or otherwise produce the replacement portion of the gear.

Figure 4 is a diagrammatical view of a sand mold showing the trimmed pattern in place therein.

Figure 5 is a similar view illustrating the replacement tooth cast of metal in the sand mold.

Figure 6 is a detail view showing the manner of positioning and maintaining the cast replacement portion of the gear during the welding of said replacement portion in the gear.

Figure 7 is a detail view illustrating one of many other uses of my improved method, the same being shown as involving the replacing of a tooth of an internal gear.

It will be understood that my present invention is not limited to the replacement of gear teeth only, as many other forms of projections and analagous structures of a metallic nature can be reproduced and inserted in accordance with my improved method and associated retaining means, and the particular type of gear chosen herein for purposes of describing the invention is but illustrative of many other types and structures which can be easily and effectively repaired.

In carrying out my method or process of repairing a broken gear by replacing a replica of the tooth broken out, I have shown in the drawing a gear 1 provided with the usual teeth, one side portion of each tooth being illustrated as worn away due to service conditions under which the gear has been performing. The broken out portion or tooth is indicated by the numeral 2 in Figure 1.

About several good teeth of the gear I provide a box-like frame 3 into which plastic material, preferably plaster of Paris, is poured to form a mold or negative pattern element 4 from which the positive pattern element 6 is formed. The positive pattern 6 is produced by positioning the negative pattern 4 within a frame 5 and pouring plastic material which may be plaster of Paris, or other workable material composed of either metallic or cementitious ingredients as may be found most suitable.

The positive pattern 6 when sufficiently hard is now taken and easily shaped or dressed down to conform to the replacement section desired, the excess portions of the pattern being trimmed and cut away until the tooth and its root portion in the example referred to herein, assumes substantially the shape illustrated in Figure 3. The pattern 7 of the replacement portion of the gear thus formed is now used from which to cast the metallic tooth, the said pattern 7 being shown arranged within the sand indicated at 8 in Figure 4 preparatory to the pouring of the metal. The cast metal tooth is indicated by the numeral 9, said tooth being now ready to be inserted within the gear and particularly the opening prepared to receive the root or base portion of the tooth. I have shown the base portion of the tooth slightly tapered and flat at the bottom but it will be understood that various shaped roots or base portions may be provided to provide an effective tie or anchorage when welded in place as will be understood.

The cast tooth 9 is now positioned within the gear 1 and suitably studded therein, as shown, the added metal to be welded in being indicated by the numeral 10. The replacement tooth is preferably shaped and positioned within the gear so as to provide for the deposition of the added metal up to and adjacent the base of the gear teeth, as shown, thereby providing for a relatively deep point of leverage at substantially the base line or root circle of the teeth, as distinguished from high points of leverage substantially near the pitch circle of the gear, caused by the relatively shallow V-shaped recesses heretofore employed when inserting machined or specially cut teeth. By lowering the point of leverage of the replaced tooth and extending the root thereof below the base or root circle of the gear a relatively stronger connection is established and when the tooth is welded in place the union produced is of maximum strength and tenacity under all load conditions for which the gear has been designed, it being obvious that the exact contour of the replaced tooth permits it to assume its full share of the work as performed by the contiguous teeth of the gear, but no more or increased duty is imparted to the replaced tooth than is taken by the other teeth of the gear.

In positioning the tooth 9 within the gear and maintaining the same therein during the welding operation, I prefer to utilize the negative pattern 4, said pattern being supported by the frame 3 or otherwise, and readily movable within said frame until the exact pitch relation of the replaced tooth is established whereupon the pattern can be held against movement as will be understood. The pattern 4 is used in the nature of a cradle to precisely adjust the pitch of the tooth or teeth, as the case may be, and the correct spacing of the replaced tooth or teeth is thereby effectively accomplished. In addition, the pattern 4 serves to prevent movement of the replaced tooth or teeth due to shrinkage of the metal during welding, and as a result the pitch of the replaced tooth when once adjusted is not disturbed by such shrinkage, as now is frequently the case. Any suitable welding service is now employed to effect the weld, an electrode and welding tool being indicated diagrammatically in dot and dash lines in Figure 6.

In Figure 7 I have shown an internal gear in which the replacement portion or tooth 12 is supported within the opening in the gear by means of a negative pattern element 14, said element serving as the cradle support as hereinbefore referred to. The tooth is studded in place and the additional metal to be welded in is indicated by the numeral 13. When the pitch and correct position of the tooth has been exactly determined the pattern 14 is held against movement, and the tooth welded in by any suitable means of welding service.

In carrying out my method I prefer to cast the replacement portion, but in some cases the pattern may be utilized as a means of providing a true replica from which the replacement portion can be copied in metal and I do not wish to be understood as limiting my invention to casting only. Similarly the plastic materials may be varied, and in some cases where appropriate materials are used to form the negative pattern, the replacement portion may be formed against said negative pattern and then suitably shaped to fit the work in which it is to be used as a replacement of the character and contour desired.

My herein described method of preparing, inserting and finally welding a replacement portion of a structure with the contour thereof invariable with the related portion of the structures provides for maximum accuracy with comparatively low cost. Changes appropriate to the successful carrying out of my invention may be resorted to in conformity with the work in hand and such departures from the exact description herein may be made without exceeding the scope of the invention which follows.

I claim:

1. The method of repairing metal structures which consists in replacing broken portions of said structure with the contour of the replaced portion invariable to a similar and unbroken portion of the structure, and welding said replacement portion to said structure.

2. The method of replacing portions of a metallic structure which consists in molding a pattern from a portion of the structure similar to the portion to be replaced, forming a replacement portion from said pattern, and finally welding said replacement portion in position in the structure.

3. The method of replacing portions of a metallic structure which consists in forming a pattern from a contiguous portion of the structure similar to the portion to be replaced, casting a replacement portion from said pattern, and then welding said replacement portion in position in the structure.

4. The method of replacing portions of a metallic structure which consists in forming a pattern from a portion of the structure corresponding to the portion to be replaced, forming another pattern from said first named pattern, casting a metallic replacement portion from said second named pattern, and finally welding said replacement portion in position in the structure.

5. The method of replacing portions of a metallic structure such as gears for example, which consists in providing a pattern from a portion of the structure corresponding to the portion to be replaced, then forming a metallic replacement section from said pattern, and finally welding said replacement section in position in said structure.

6. The method of replacing portions of a metallic structure such as gears for example, which consists in forming a pattern from a portion of the structure corresponding to the portion to be replaced, then forming another pattern from said first named pattern, then providing a replacement section from said second named pattern, and finally welding said replacement section in position in said structure.

7. The method of replacing portions of a metallic structure such as gears for example which consists in providing a negative pattern of plastic material from a portion of the structure corresponding to the portion to be replaced, then forming a positive pattern of plastic material from said negative pattern, then forming a metallic replacement section from said positive pattern, and finally welding said replacement section in position in said structure.

8. The method of replacing portions of a metallic structure such as gears for example which consists in molding a pattern of plastic material from a portion of the structure corresponding to the portion to be replaced, then forming from said molded pattern another pattern of plastic material, then casting a metallic replacement portion from said second mentioned pattern, and finally welding said cast metallic replacement portion in position in said structure.

9. The method of replacing portions of a metallic structure such as gears for example, which consists in forming a pattern of plastic material from a portion of the structure corresponding to the portion to be replaced, then forming from said pattern another pattern of plastic material, then trimming said second mentioned pattern to a size corresponding to the size of the portion of the structure to be replaced, then casting from said trimmed pattern a metallic replacement portion, and finally welding said replacement portion in position in said structure.

10. The method of replacing portions of a metallic structure such as gears for example, which consists in forming a pattern by applying plastic material to a portion of the structure corresponding to the portion to be replaced, then forming a metallic replacement section from said pattern, and finally welding said metallic replacement section in position in said structure.

11. The method of replacing portions of a metallic structure such as a gear which consists in providing a pattern molded from a section of the structure corresponding to the portion or section to be replaced, then casting another pattern from said first mentioned pattern, then reducing said second mentioned pattern to a size corresponding to the portion to be replaced, then casting a metallic replacement portion or section from said second named pattern, then positioning said cast metallic replacement portion and applying the first named pattern to the gear for maintaining said cast replacement portion in relative fixed position between adjacent portions of the gear, and finally welding said cast replacement portion in said structure while so maintained in position.

12. The method of replacing portions of a metallic structure such as a gear which consists in providing a pattern molded from a section of the structure corresponding to the portion or section to be replaced, then providing a metallic replacement section, then positioning said replacement section in spaced and pitch relation to adjacent portions of the gear, then applying said pattern for maintaining the replacement section in fixed spaced pitch relation to the teeth of the gear, adding welding metal between the replacement section and adjacent sides of the gear, and finally welding said replacement section to the gear.

13. The method of replacing portions of a metallic structure such as a gear which consists in providing a pattern molded from a section of the structure corresponding to the portion or section to be replaced, then forming another pattern from said first named pattern, then dressing said second named pattern to provide a pattern having a root portion, then providing a metallic replacement section from said second named pattern with a corresponding root portion, then positioning said metallic replacement section in spaced and pitch relation to adjacent teeth of the gear with the root portion of said replacement section below the base of the teeth of the gear, and welding said metallic replacement section to the gear.

14. The method of replacing portions of a metallic structure such as a gear which consists in providing a pattern molded from a section of the structure corresponding to the portion or section to be replaced, then forming another pattern from said first named pattern, then dressing said second named pattern to provide a pattern having a root portion, then providing a metallic replacement section from said second named pattern with a corresponding root portion, then positioning said metallic replacement section in spaced and pitch relation to adjacent teeth of the gear with the root portion of said replacement section below the base of the teeth of the gear, then applying the first mentioned pattern for maintaining the replacement section in fixed, spaced and pitch relation to the teeth of the gear with the root portion of the replacement section below the base line of the teeth, adding welding metal between the replacement section and gear, and welding said replacement section to the gear.

15. The method of replacing portions of a metallic structure which consists in forming a pattern from a portion of the structure corresponding to the portion to be replaced, forming a metallic replacement section from said pattern, then positioning said replacement section within the structure and applying said pattern thereto for maintaining the said replacement section in related position to said structure, and welding said replacement section to the structure while so positioned and maintained.

16. The method of replacing portions of a metallic structure which consists in molding a pattern from a portion of the structure corresponding to the portion to be replaced, forming another pattern of soft material from said first named pattern, shaping and dressing said second named pattern to the size of the replacement section desired, casting a metallic replacement section from said dressed and shaped pattern, positioning said cast replacement section within the structure and applying said first named pattern thereto for maintaining said replacement section in position in said structure, adding welding metal between said replacement section and metallic structure, and welding said replacement section to the structure.

17. A repair pattern for metallic replacements formed of relatively soft material molded about a portion of a metallic structure corresponding in contour to the replacement sought.

18. A repair pattern for metallic replacements formed of relatively soft material reproduced from a portion of a metallic structure corresponding to the contour of the replacement sought.

19. A pattern for forming metallic replacements of broken gear teeth, said pattern being reproduced from other unbroken teeth corresponding to the contour of the replaced tooth or teeth.

20. A pair of patterns for forming replacement portions of metallic structures, one of said patterns being formed about a portion of the metallic structure corresponding in contour to the replacement sought, and the other of said patterns being molded from said first formed pattern.

In testimony whereof I affix my signature.
ROYAL MATTICE.